US011750777B2

(12) United States Patent
LaCroix et al.

(10) Patent No.: US 11,750,777 B2
(45) Date of Patent: Sep. 5, 2023

(54) VIDEO MANAGEMENT SYSTEM AND METHOD FOR RETRIEVING AND STORING DATA FROM SURVEILLANCE CAMERAS

(71) Applicant: Johnson Controls Tyco IP Holdings LLP, Milwaukee, WI (US)

(72) Inventors: Scott LaCroix, Litchfield, NH (US); Patrick Siu, Tyngsborough, MA (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 16/613,243

(22) PCT Filed: Nov. 8, 2017

(86) PCT No.: PCT/US2017/060610
§ 371 (c)(1),
(2) Date: Nov. 13, 2019

(87) PCT Pub. No.: WO2019/005188
PCT Pub. Date: Jan. 3, 2019

(65) Prior Publication Data
US 2020/0120313 A1    Apr. 16, 2020

Related U.S. Application Data

(60) Provisional application No. 62/526,088, filed on Jun. 28, 2017.

(51) Int. Cl.
*H04N 7/18* (2006.01)
*G08B 13/196* (2006.01)
*H04L 67/5682* (2022.01)

(52) U.S. Cl.
CPC ....... *H04N 7/188* (2013.01); *G08B 13/19656* (2013.01); *G08B 13/19676* (2013.01); *H04L 67/5682* (2022.05); *H04N 7/181* (2013.01)

(58) Field of Classification Search
CPC ........ H04N 7/18; H04N 7/181; H04L 67/568; H04L 67/5682; G08B 13/19656; G08B 13/19676
See application file for complete search history.

(56) References Cited

U.S. PATENT DOCUMENTS 6,292,098 B1 *  9/2001  Ebata ............... G08B 13/19656
                                                      340/506
9,516,219 B2 * 12/2016  Okada ................... H04N 5/247
(Continued)

FOREIGN PATENT DOCUMENTS

WO      WO 01/28251        4/2001

OTHER PUBLICATIONS

International Preliminary Report on Patentability, dated Jan. 9, 2020, from International Application No. PCT/US2017/060610, filed on Nov. 8, 2017. 12 pages.

(Continued)

*Primary Examiner* — Kyle M Lotfi
(74) *Attorney, Agent, or Firm* — ArentFox Schiff LLP

(57) ABSTRACT

A surveillance camera and surveillance data storage system includes a video management system (VMS) with a backfill monitor controlling the process of transferring backfill surveillance data locally stored on the cameras to the VMS. The backfill monitor accesses information in a transfer policy and camera schedule dictating priority and bandwidth settings for each camera or for groups of cameras and uses the information to allocate the order, timing and speed of the transfers. The backfill monitor can further adjust the transfer speeds continuously and in real time according to the current conditions of the network.

26 Claims, 7 Drawing Sheets

(56) References Cited

U.S. PATENT DOCUMENTS

| | | | |
|---|---|---|---|
| 10,372,995 B2* | 8/2019 | Zhang | G06K 9/00751 |
| 2005/0132414 A1 | 6/2005 | Bentley et al. | |
| 2006/0088092 A1* | 4/2006 | Chen | G08B 13/19656 |
| | | | 375/240.01 |
| 2012/0218416 A1* | 8/2012 | Leny | H04N 7/181 |
| | | | 348/E7.085 |
| 2012/0320928 A1* | 12/2012 | Takada | H04L 67/322 |
| | | | 370/401 |
| 2013/0198345 A1 | 8/2013 | Hagens et al. | |
| 2013/0336627 A1* | 12/2013 | Calvert | H04N 21/2187 |
| | | | 386/224 |
| 2015/0109438 A1* | 4/2015 | Matsuda | H04N 21/2187 |
| | | | 348/143 |
| 2016/0295172 A1* | 10/2016 | Cuddeback | H04N 7/20 |
| 2017/0289601 A1* | 10/2017 | Ganster | G08B 13/19656 |
| 2018/0033273 A1* | 2/2018 | Siminoff | H04N 5/33 |

OTHER PUBLICATIONS

International Search Report and Written Opinion of the International Searching Authority, dated May 25, 2018, from International Application No. PCT/US2017/060610, filed on Nov. 8, 2017. 20 pages.

\* cited by examiner

VIDEO MANAGEMENT SYSTEM AND METHOD FOR RETRIEVING AND STORING DATA FROM SURVEILLANCE CAMERAS

RELATED APPLICATIONS

This application is a § 371 National Phase Application of International Application No. PCT/US2017/060610, filed on Nov. 8, 2017, now International Publication No. WO 2019/005188, published on Jan. 3, 2019, which International Application claims the benefit under 35 USC 119(e) of U.S. Provisional Application No. 62/526,088, filed on Jun. 28, 2017, both of which are incorporated herein by reference in their entirety.

BACKGROUND OF THE INVENTION

Video surveillance, e.g., security, systems are often deployed in and around buildings as well as in metropolitan settings. Example buildings and metropolitan settings include schools, government buildings, commercial buildings, residential buildings, multi dwelling units, roads and highways, and town and city centers.

Historically, surveillance camera systems were often proprietary/closed-standards systems. Surveillance cameras were directly wired to a local video storage system and surveillance data, including captured image data, captured audio data and/or meta-data from the cameras were compiled into matrix views for real time viewing at possibly a security guard station or back office video monitor. Each camera typically required significant installation time and adjustment because of their "hard wired" connection. In addition, the local video storage system was typically a video cassette recorder (VCR) located in a network room or the back office within the premises being monitored.

More recently, internet protocol (IP) surveillance cameras have become increasingly common. These cameras utilize standard protocols over wired and/or wireless networks. The surveillance data is sent for storage to possibly a video management system (VMS) and monitors for displaying images such as video from the security cameras.

Even more recently, surveillance cameras have been offered that include surveillance data storage on the cameras themselves. Such surveillance cameras are especially attractive to smaller organizations such as stores, small companies, and local offices that want to reduce installation and maintenance expenses. Each camera can function as a stand-alone unit, and as a result there is no need to have a specialized surveillance data storage system. With the advent of improved image compression on one hand, and the decreasing costs of data storage on the other hand, each surveillance camera is able to store surveillance data gathered over hour or days. Adding data storage to the cameras also makes the systems more robust against network outages since the surveillance data can be buffered on the camera and then uploaded to the VMS according to a schedule or based on when the network is fixed.

At the same time, another trend has been to utilize remote cloud VMS's for storing surveillance data from surveillance cameras. While the surveillance cameras are typically purchased by the organizations and mounted within their premises, the storage of the surveillance data will often be leased from a service provider. Such a solution can be attractive to smaller organizations such as stores, small companies, and local offices that want to reduce installation and maintenance expenses. Operations upon the surveillance data such as retrieval of previously recorded video can also be provided as part of the service.

A number of scenarios can cause the surveillance cameras to transfer surveillance data to their VMS's. Some surveillance cameras are event driven. These cameras transfer surveillance data in response to detecting events such as motion. Other surveillance cameras continuously transfer surveillance data to the VMS.

Network outages can result in the surveillance cameras having a backlog of locally stored surveillance data that needs to be transferred to the VMS, or "backfilled." Currently, in the event of a network outage, the surveillance cameras push the backfill surveillance data to the VMS as soon as network connectivity is restored.

SUMMARY OF THE INVENTION

A push approach to surveillance data backfill can cause problems. It results in arbitrary bandwidth allocation to the different surveillance cameras, which can cause or exacerbate network congestion issues.

The present invention concerns a more intelligent approach to surveillance data backfill. The VMS has the ability to control the process of transferring surveillance data by, for example, allocating bandwidth availability for different cameras based on a number of factors including network conditions, backfill policies, scheduling, and priorities.

The present invention includes is a VMS with the ability to recover surveillance data, including locally stored image, audio and/or meta-data (including analytics data) from surveillance cameras in a manner that considers bandwidth constraints, camera prioritization, scheduling constraints, and network availability issues, preferably without impacting existing live recording streams.

According to the present invention, all transfers of backfill surveillance data from the cameras to the VMS are centrally controlled by a backfill monitor, which might be a process executing on the VMS or a separate server. The transfers can be initiated by the backfill monitor pulling the backfill surveillance data from the individual cameras in a particular order, or by the cameras themselves pushing requests for transfer tickets from the backfill monitor. In response to the requests for transfer tickets, the backfill monitor generates and allocates transfer tickets specifying particular details of the transfer such as when to start the transfer and the transfer speed. These transfer tickets are continually replaced with new tickets with new transfer details as new requests for transfer tickets are received and bandwidth allocation among the cameras transferring backfill surveillance data changes. In this way, the transfer of backfill surveillance data from all cameras is centrally controlled regardless of whether the data is pulled by backfill monitor or transfer ticket requests are pushed by the cameras.

In either case, the order in which the cameras transfer the backfill surveillance data is determined by a user-specified transfer policy and camera schedule. The transfer policy defines bandwidth, priority and other baseline settings for determining the order and speed of transfers. Within the transfer policy, cameras can be configured for higher or lower bandwidth, and higher or lower priority in ordering among the cameras, among other examples. The camera schedules include specific times for cameras to initiate transfers of backfill surveillance data. In one example, if a camera has sufficient storage capacity, it can record all surveillance data for a given time period locally, and then transfer the backfill surveillance data at the user-defined times according to the camera schedule.

Priority settings in the transfer policy for the different cameras or groups of cameras include high, medium or low priority. Cameras that are flagged as vital to the end-user would be designated as high priority, and the backfill monitor would allocate more bandwidth to recovering backfill surveillance data from those cameras. The backfill surveillance data from low or medium priority cameras would be deferred.

The transfer policy can also include settings related to video analytics. For example, the transfer policy can specify cameras for which backfill surveillance data can be quickly re-inserted into the media database, or for which the surveillance data needs to be analyzed as the media is being inserted. This reduces the load on the VMS and allows alarms and/or events to be generated more quickly.

The backfill monitor resolves contention among multiple cameras or groups of cameras with identical settings according to the transfer process and/or camera schedule by considering other factors such as the types and/or capabilities of the different cameras, network conditions recorded from past surveillance data transfers and/or other conditions and rules.

In addition to determining the order of transfers via the transfer policy and camera schedule, the backfill monitor monitors all network connections to all cameras and adjusts the transfer rates of the cameras from the baseline to reduce the load on each individual network connection. Thus, if the backfill monitor determines that there is high network loss on a camera transferring backfill surveillance data, the network connection with that camera can be tuned dynamically, for example, by decreasing for a short duration the transfer speed from the baseline transfer speed specified by the transfer policy. The transfer rate for that camera can then be restored to the baseline setting as the network load returns to normal. For example, a camera defined as high priority in the transfer policy will always be transferred ahead of a camera with medium or low priority, but its transfer speed may be increased or decreased within a predetermined range for its priority group as network conditions change or other cameras begin transferring backfill surveillance data.

The backfill monitor will recover backfill surveillance data from cameras set as higher priority before lower priority, allocating as much bandwidth as possible based on the rules defined in the transfer policy and based on the current network conditions, without adversely impacting the live recording of other cameras in the system.

In general, according to one aspect, the invention features a video management system, comprising a surveillance data store for storing surveillance data from surveillance cameras and a server system executing a storage process that requests surveillance data stored on the surveillance cameras and stores the surveillance data to the surveillance data store in order to backfill surveillance data that is cached on the surveillance cameras.

In embodiments, the server system executes a network usage process that monitors usage of a network connecting the surveillance cameras to the server system. The network usage process reports a level of network usage/congestion to the storage process, and the storage process decreases or increases a rate at which the surveillance cameras transfer the surveillance data to the storage process of the server system based on the level of network usage.

The storage process typically accesses a camera priority policy and then requests surveillance data stored on the surveillance cameras based on the priority policy. The camera priority policy dictates priority among the surveillance cameras and network allowance specifying maximum data transfer rates.

The storage process determines when surveillance data is cached on the surveillance cameras due to a network outage or, alternatively, due to a camera transfer schedule, and backfills the surveillance data by requesting the surveillance data that was cached on the surveillance cameras.

The surveillance data includes image data, audio data and/or meta-data.

In general, according to another aspect, the invention features a surveillance data storage management method. Surveillance data that is cached on surveillance cameras is requested, and stored to a surveillance data store in order to backfill the surveillance data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
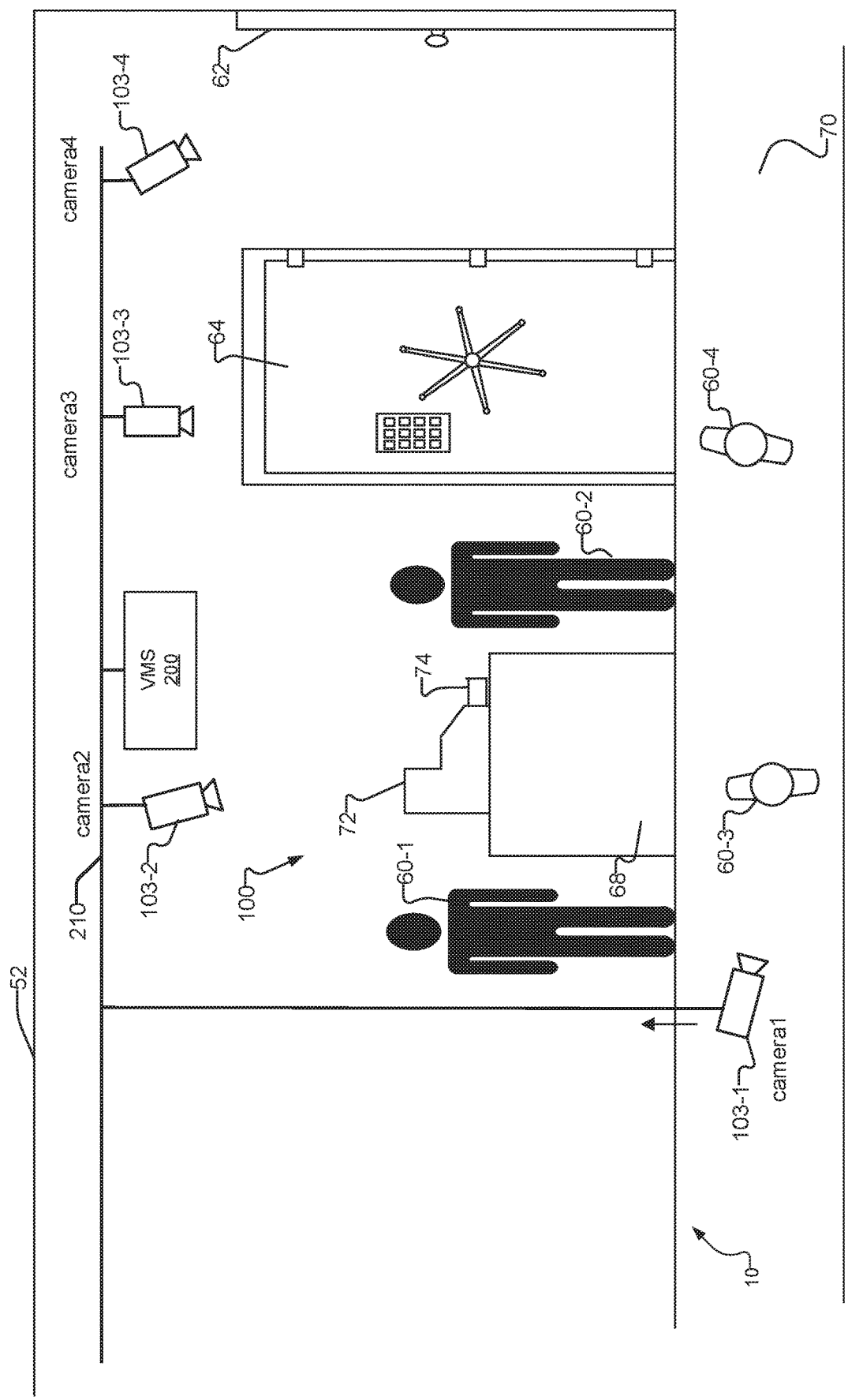
FIG. 1 shows an exemplary surveillance camera system to which the present invention is applicable.

FIG. 1 shows an exemplary surveillance camera system 10 including surveillance cameras 103 and a video management system (VMS) system 200 to which the present invention is applicable.

The surveillance cameras 103 are shown installed at a premises 52 of an organization. This might be a building or other structure. The camera could generate surveillance data both from inside or the surrounding areas. In other examples, the surveillance data might be generated from a metropolitan area by a governmental agency.

The surveillance cameras 103 communicate with each other and with the security devices over a local network 210. Surveillance cameras with reference numbers 103-1 through 103-4 are associated with cameras "camera1" through "camera4," respectively. Other security devices (not illustrated) could also be located on the network 210, including sensor devices such as motion detectors, LED lights, and relays or contact switches, in examples.

The surveillance cameras 103 generate surveillance data, including captured image data, captured audio data and/or meta-data. The meta-data includes date and time information and video analysis information such as security events, among other examples. The surveillance cameras 103 locally store the surveillance data and/or transfer the surveillance data to the VMS 200. The surveillance data can then be accessed by workstations and mobile user devices such as smartphones, tablet computing devices, laptop computer running operating systems such as Windows®, Android®, Linux®, or IOS®, in examples.

A specific example showing how the cameras might be deployed is illustrated. Within the premises 52, camera1 103-1 focuses upon persons 60-3 and 60-4 located in an aisle or on a sidewalk 70 adjacent to the premises 52. Camera2 103-2 focuses upon a point of sale area 100 within the premises 52. The point of sale area 100 includes a cash register or point of sale terminal 72 located on top of a desk 68. Camera3 103-3 captures surveillance data and detects motion near a safe 64. Finally, camera4 103-4 detects motion of individuals 60 near a door 62 providing entry to or exit from the premises 52.

During normal operation of the surveillance camera system 10, the cameras 103 transfer surveillance data to the VMS 200. Some of the cameras 103 transfer the surveillance data as it is generated, while others store the surveillance data locally and then transfer it to the VMS 200 at scheduled intervals. During periods when network connectivity is lost, the cameras 103 store the generated surveillance data locally. At some point after network connectivity is restored, the cameras 103 transfer backfill surveillance data to the VMS 200.

In general, the VMS 200 centrally controls the process of transferring the backfill surveillance data from the cameras 103 by determining the order and/or timing and transfer speed of transfers from the cameras 103 based on user-specified settings and current conditions of the network 210 and other policies.

Figure 2:
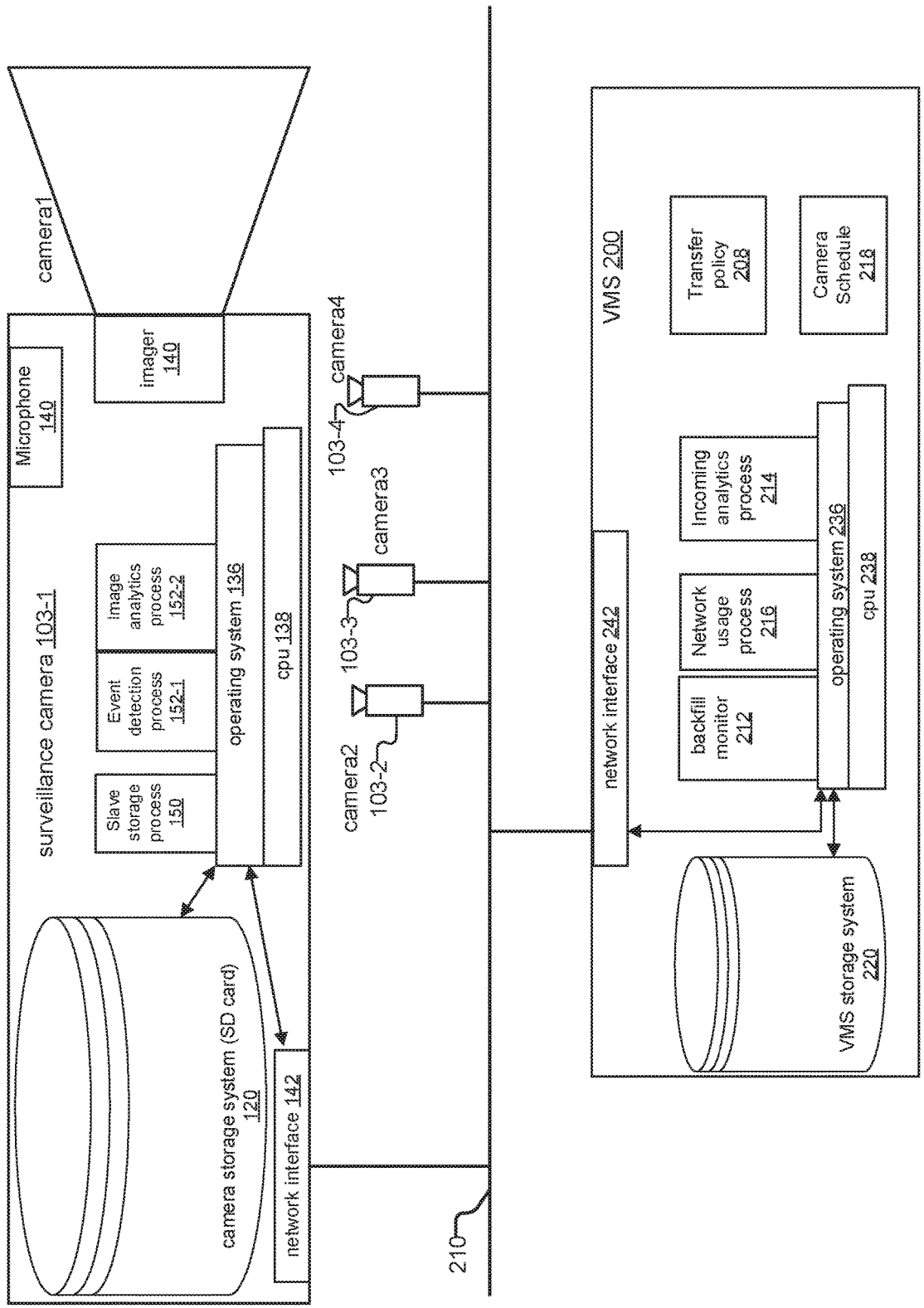
FIG. 2 is a schematic diagram illustrating components of the cameras, the video management system, and the network, according to one embodiment of the present invention.

FIG. 2 is a schematic diagram illustrating components of the cameras 103, the VMS 200, and the network 210, according to one embodiment of the present invention.

In the illustrated example, camera1 through camera4 are depicted. However, a detailed view of the components of the cameras 103 is only included for camera1 for the sake of clarity.

By way of overview, each camera 103 includes a processing unit (CPU) 138, an imager 140 for generating image data of the camera's field of view, a microphone 140 for generating audio data, a camera storage system 120 and a network interface 142. An operating system 136 runs on top of the CPU 138. The camera 103 stores surveillance data, including the image data and audio data, and/or meta-data. The meta-data is generated by event detection and/or image analytics processes 152 executing on the operating system 136. This surveillance data is stored locally to its camera storage system 120 under the control of a slave storage process 150. This process also, in general, directs the transfer of surveillance data and backfill surveillance data to the VMS 200.

The network interface 142 includes wired network interface such as a RJ-45 jack for connection to wired network 210, which would be network based on the IEEE 802.3 standard, in the typical example. In other cases, the network interface 142 could be a wireless network interface based on the 802.11 Wi-Fi standard. In this latter case, the connection to the wired network 210 would typically be made through an intervening wireless access point.

In the illustrated example, the camera storage system 120 is a removable non-volatile memory card such (for example, a Secure Digital (SD) memory card). In other examples, the camera storage system 120 can also include onboard non-volatile (e.g., flash) memory, other types of removable flash memory and/or a hard drive.

In the illustrated example, the VMS 200 is a server computer with an internal or attached VMS storage system 220 for storing the surveillance data, a CPU 238, and a network interface 242. As with the cameras 103, an operating system 236 runs on top of the CPU 238, and several processes execute on top of the operating system 236, including a backfill monitor 212, a network usage process 216, and in incoming video analytics process 214.

The backfill monitor 212 directs the process by which the cameras 103 transfer backfill surveillance data to the VMS 200. The backfill monitor 212 pulls backfill surveillance data from cameras 103 that have previously lost network connectivity and for which network connectivity has been restored. The backfill monitor also pulls backfill surveillance data from cameras that have otherwise buffered the surveillance data locally such as based on a schedule. The backfill monitor 212 also processes requests for transfer tickets pushed from the cameras 103 by allocating bandwidth and determining the timing for each transfer ticket.

The backfill monitor 212 determines the order and/or timing of the transfers. This based on a transfer policy 208, which, in general, includes priority and bandwidth settings for the different cameras 103 or groups of cameras 103, and/or a camera schedule 218, which includes information about scheduled transfer times. The backfill monitor 212 further resolves contention among multiple cameras 103 with identical priority and bandwidth settings based on other factors such as the types and capabilities of the cameras 103, network conditions recorded from past surveillance data transfers and/or other conditions and rules. The backfill monitor 212 continually adjusts the allocated bandwidth and the order of transfers based on the current conditions of the network 210.

The network usage process 216 continuously monitors the network 210. The network usage process 216 assesses the total network congestion and also network latency, i.e., the time required to send a message to and/or from any of the cameras. The network usage process also generates information about usage and connectivity with individual cameras 103. The assessment of the network is sent to the backfill monitor 212.

The incoming analytics process 214 directs the process by which analytics are performed on incoming backfill surveillance data before the data is stored in the VMS storage system 220, by accessing information in the transfer policy 208. For example, for all low priority cameras, the incoming analytics process 214 skips performing analytics before storing the surveillance data from those cameras 103 in the VMS storage system 220. Analytics performed on recovered backfill surveillance data is incidental and doesn't impact the backfill process. For backfill surveillance data, the analytics are performed after the incoming data is transferred to the VMS 200 and after the backfill monitor 212 sends the backfill surveillance data to be stored in the VMS storage system 220, but before the data is stored in the storage system.

Figure 3:
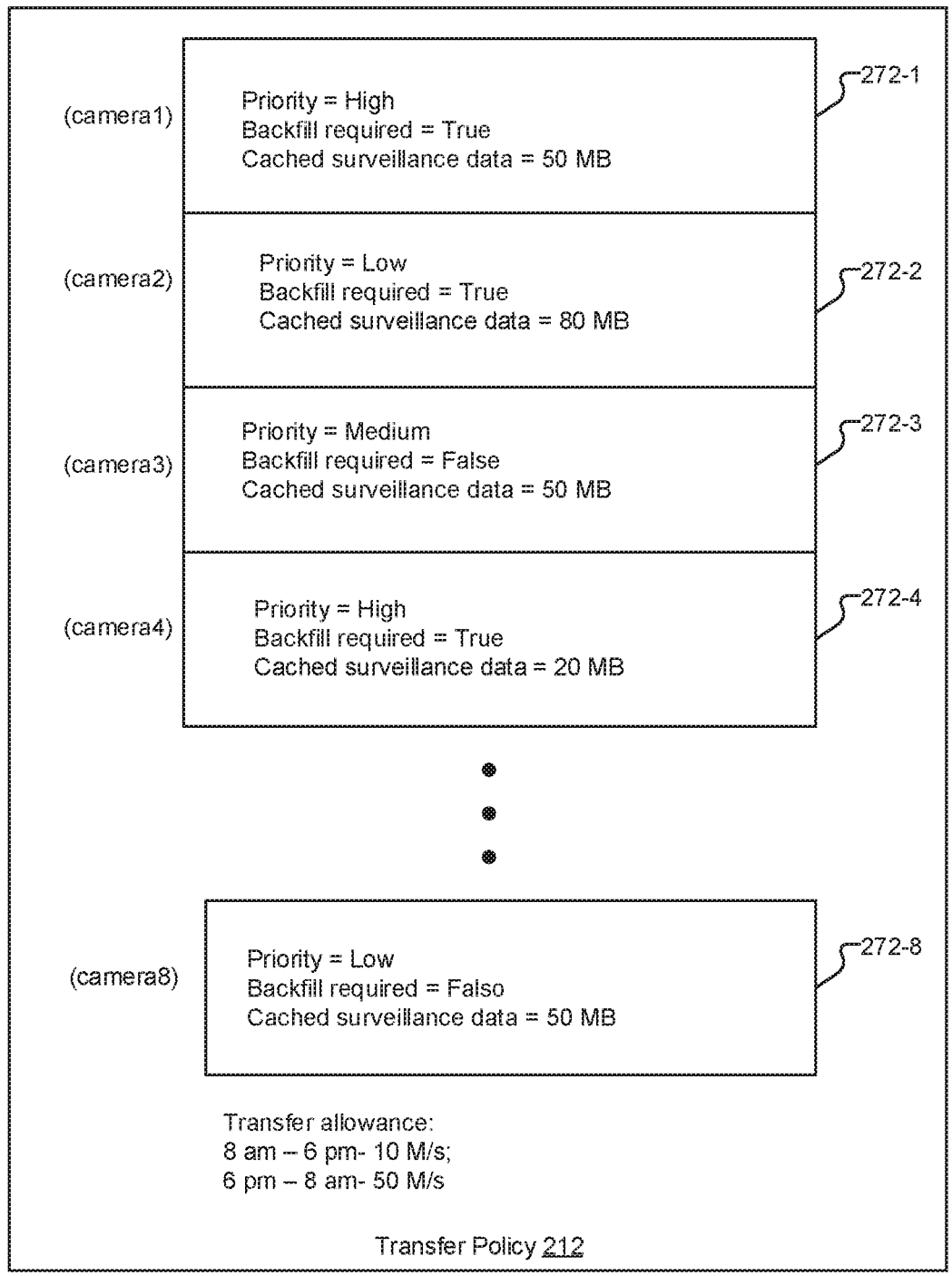
FIG. 3 is a diagram illustrating an example of user specified settings included in the transfer policy.

FIG. 3 is a diagram illustrating an example of user specified settings included in the transfer policy 208.

Included in the transfer policy 208 in the illustrated example are transfer policy records 272 for each camera 103. The transfer policy record 272-1 for camera1 indicates that the priority for camera1 is specified as "High", that backfill is required for the camera 103 and that the camera 103 has a capacity to store 50 MB of cached surveillance data. On the other hand, the transfer policy record 272-8 for camera8 indicates that the priority for camera8 is specified as "Low", that backfill is not required for the camera 103 and that the camera 103 has a capacity to store 50 MB of cached surveillance data.

Also included in the transfer policy 208 is information about peak and off-peak windows of time for transferring backfill surveillance data, indicating that the transfer allowance from the hours of 8 am through 6 pm is 10M/s, and the transfer allowance from the hours of 6 pm through 8 am is 50M/s.

Figure 4:
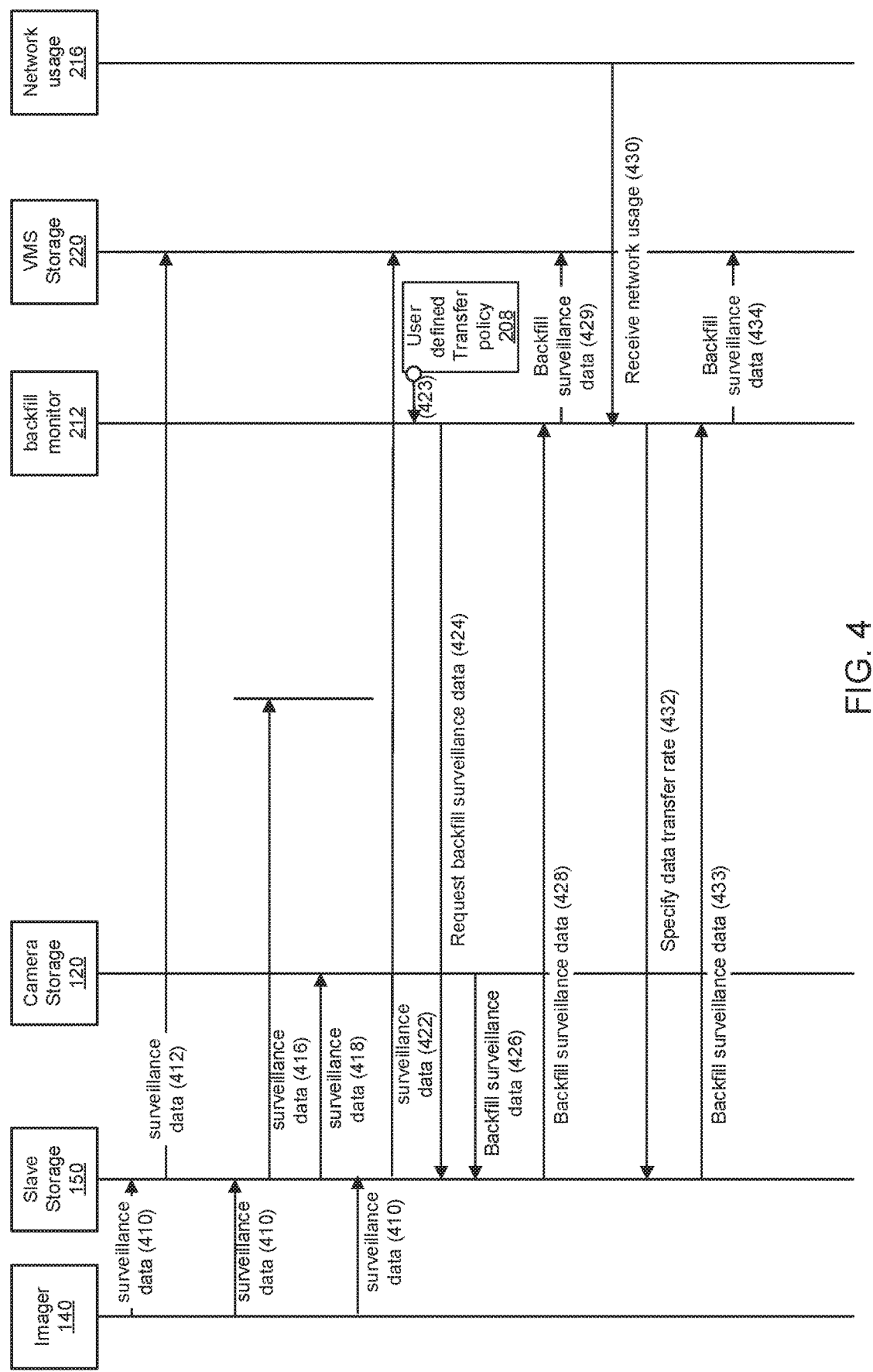
FIG. 4 is a sequence diagram illustrating the process by which the backfill monitor controls the transfer of backfill surveillance data to the video management system.

FIG. 4 is a sequence diagram illustrating the process by which the backfill monitor 212 controls the transfer of backfill surveillance data to the VMS 200.

During normal operation, the slave storage process 150 receives surveillance data, including image data from the imager 140, as shown in step (410), and sends the surveillance data to be stored on the VMS storage system 220 (412).

During a network outage, when network connectivity between the camera 103 and the VMS 200 is lost, indicated by the slave storage process 150 receiving the surveillance data from the imager 140 (410) and attempting but failing to send the surveillance data to the VMS storage system 220 (416), the slave storage process 150 instead directs the surveillance data to be stored locally in the camera storage system 120 (418), and the backfill monitor 212 is notified, for example, by the VMS storage system 220 that the connection to the camera 103 has been lost. Such outages could be the result of the entire network experiencing a failure or possibly only the camera itself has lost connectivity. This can happen more frequently if the camera has a wireless data interface 142 that provides connection to or across the network 210.

The slave storage process 150 continues to attempt to transfer surveillance data to the VMS 200. When connectivity is restored, indicated by when current surveillance data received from the imager 140 (410) is successfully transferred to the VMS 200 (422), the backfill monitor 212 retrieves information from the transfer policy 208 about the cameras 103 for which connectivity was lost (423). The backfill monitor 212 uses the information in the transfer policy 208 to determine, for example, the order in which to request backfill surveillance data from the cameras 103 and/or the baseline transfer speed for each of the cameras 103. The backfill monitor 212 then requests the backfill surveillance data from the cameras according to the policy (424).

In response to the request for the backfill surveillance data, the slave storage process 150 retrieves the backfill surveillance data from the camera storage system 120 (426) and sends it to the backfill monitor 212 (428), which directs the data to be stored in the VMS storage system 220 (429).

On a continuous basis, the backfill monitor 212 receives network usage information from the network usage process 216 (430). In response to receiving the network usage information, the backfill monitor 212 adjusts the transfer rate for the cameras 103, for example, by increasing or decreasing the baseline transfer rate specified in the transfer policy 208. The backfill monitor 212 then specifies the new data transfer rate to the slave storage process 150 (432), which continues to transfer the backfill surveillance data at the adjusted transfer rate (433) until the transfer is completed or until a new transfer rate is specified by the backfill monitor 212.

The backfill surveillance data is then stored in the VMS storage system 220 as before (434).

Figure 5:
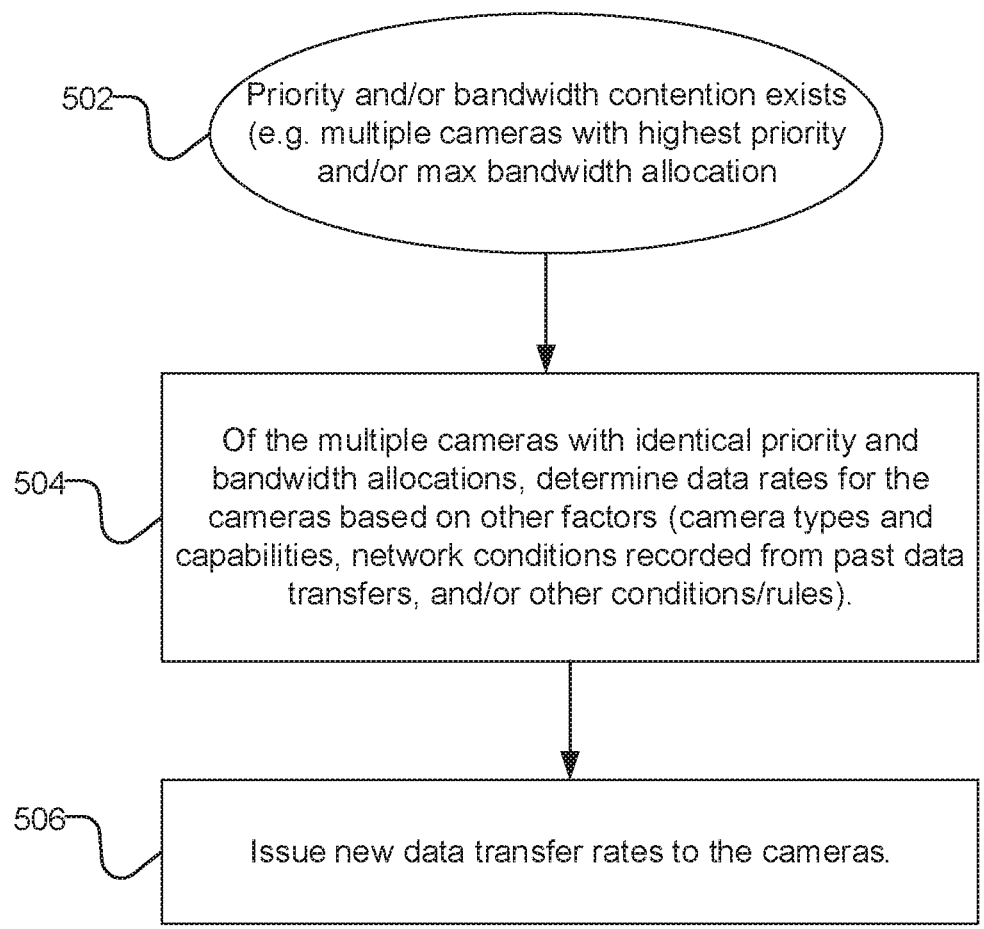
FIG. 5 is a flow diagram illustrating the process by which the backfill monitor resolves contention among cameras with identical priority and/or bandwidth settings specified in the transfer policy.

FIG. 5 is a flow diagram illustrating the process by which the backfill monitor 212 resolves contention among cameras 103 with identical priority and/or bandwidth settings specified in the transfer policy 208.

First, in step 502, the process initiates when priority and/or bandwidth contention exists (for example, multiple cameras 103 are specified to have the highest priority and/or the maximum bandwidth allocation according to the transfer policy 208).

In step 504, the backfill monitor 212 determines the data transfer rates for the cameras with identical priority and/or bandwidth allocations based on other factors such as the camera types and capabilities, network conditions recorded from past data transfers, and/or other conditions and rules.

In step 506, the data transfer rates are issued to the cameras 103 according to the results of step 504.

Figure 6:
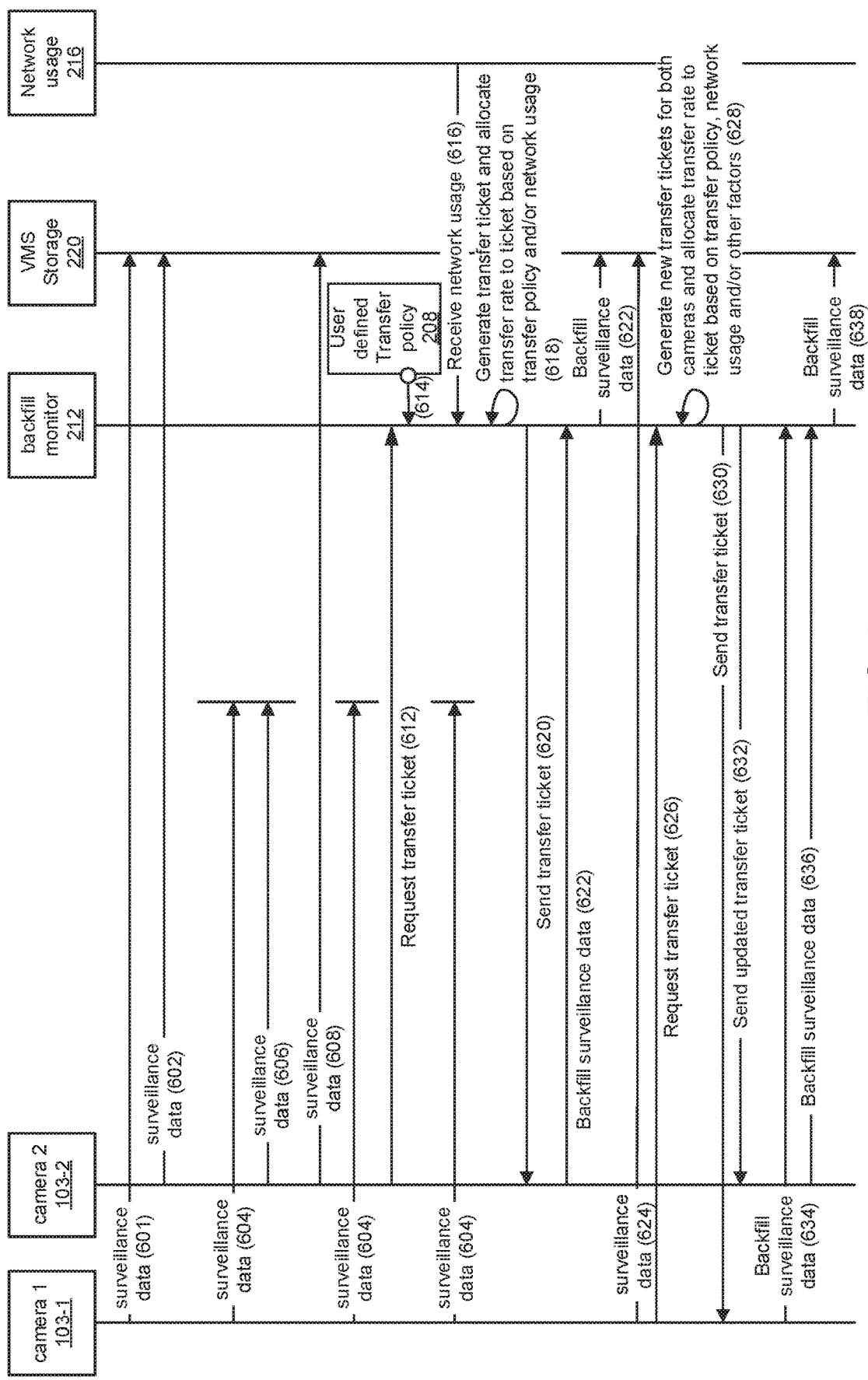
FIG. 6 is a sequence diagram illustrating the process by which the backfill monitor controls the transfer of backfill surveillance data to the video management system using transfer tickets.

FIG. 6 is a sequence diagram illustrating the process by which the backfill monitor 212 controls the transfer of backfill surveillance data to the VMS 200 using transfer tickets.

As before, during normal operation camera1 103-1 and camera2 103-2 transfer their respective surveillance data to the VMS storage system 220 (601, 602).

During a network outage, surveillance data from both cameras 103 does not reach the VMS storage system 220 (604, 606).

Connectivity with camera2 103-2 is then restored, as camera2 103-2 successfully transfers surveillance data to the VMS storage system 220 (608). However, the connectivity with camera1 103-1 has not been restored, as the transfer of surveillance data from camera 1 to the VMS storage system 220 continues to fail (604).

Camera2 103-2 initiates the transfer by requesting a transfer ticket from the backfill monitor 212 (612). The backfill monitor 212 accesses information from the transfer policy 208 (614) as well as network usage information from the network usage process 216 (616) in order to allocate bandwidth to camera2 by setting the timing and speed of the transfer, both of which are included in a transfer ticket generated by the backfill monitor 212 (618). The transfer ticket is then sent from the backfill monitor 212 to camera2 103-2 (620).

Camera2 103-2 then begins transferring backfill surveillance data to the backfill monitor 212 according to the transfer ticket (622). The backfill monitor 212 stores the backfill surveillance data in the VMS storage system 220 (622).

Connectivity with camera1 103-1 is then restored, as camera1 103-1 successfully transfers surveillance data to the VMS storage system 220 (624). As a result, camera1 103-1 requests a transfer ticket from the backfill monitor 212 (626).

Now, the backfill monitor 212 generates new transfer tickets for both camera1 103-1 and camera2 103-2, and bandwidth is allocated to both cameras 103 via the tickets according to the transfer policy 208 (628). In one example, if camera1 103-1 has higher priority and bandwidth settings than camera2 103-2, the timing and transfer rate indicated by the newly generated transfer tickets would reflect that, and (for example) the newly issued transfer rate for camera2 103-2 could be less than before the request for a transfer ticket was received from camera1 103-1. The newly generated transfer tickets are sent to camera1 130-1 and camera2 130-2 (630, 632).

Both cameras 103 now send the backfill surveillance data to the backfill monitor 212 (634, 636), which stores the backfill surveillance data in the VMS storage system 220 as before (638).

New transfer tickets for any/all of the cameras 103 transferring backfill surveillance data can be generated and sent by the backfill monitor 212 at any time, reflecting new transfer timing and rates allocated to the different cameras 103 based on changing conditions of the network 210 and/or newly received requests for transfer tickets.

Figure 7:
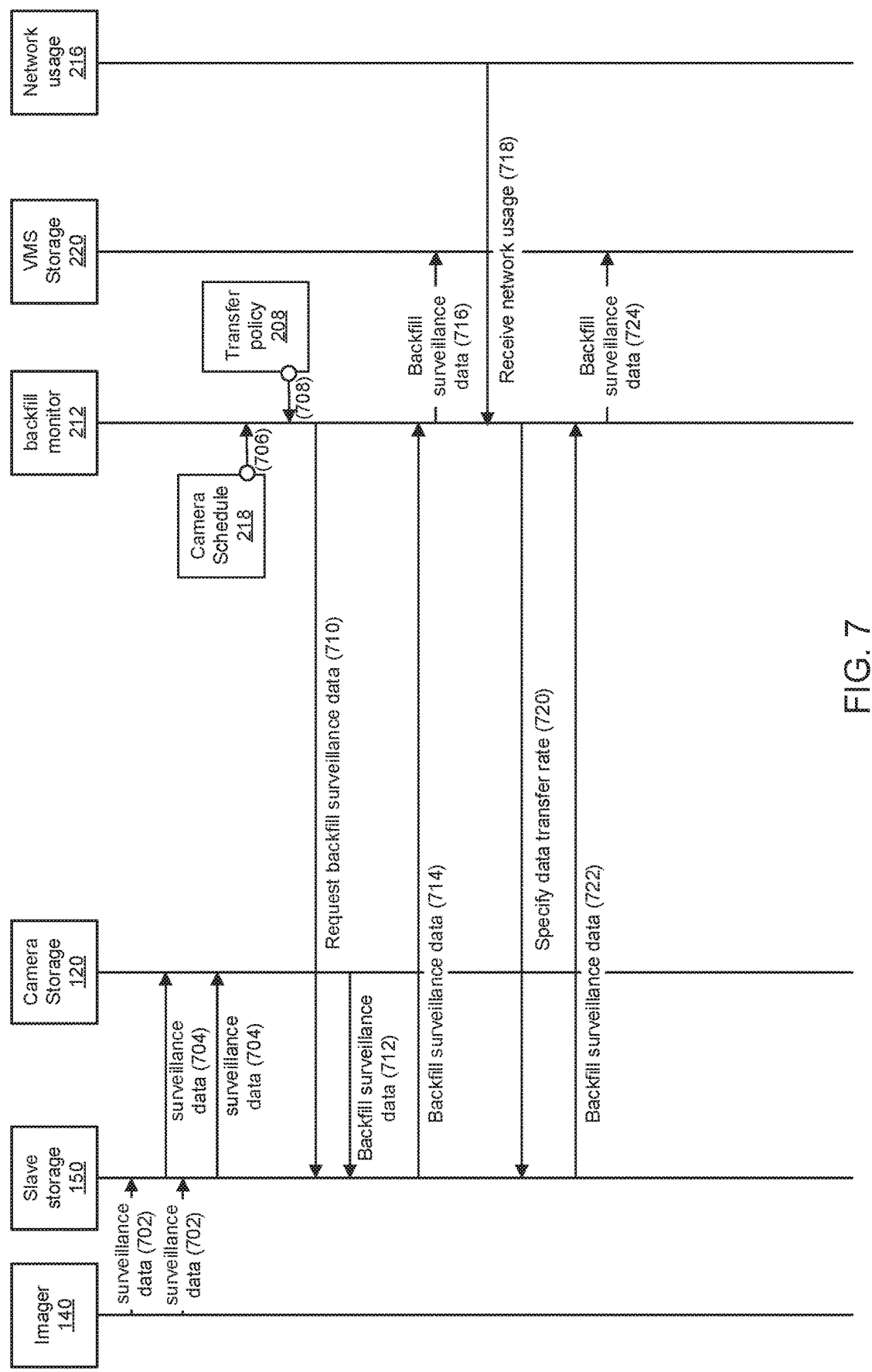
FIG. 7 is a sequence diagram illustrating the process by which the backfill monitor controls the transfer of backfill surveillance data to the video management system according to the camera schedule 218.

FIG. 7 is a sequence diagram illustrating the process by which the backfill monitor 212 controls the transfer of backfill surveillance data to the VMS 200 according to the camera schedule 218.

During normal operation, the slave storage process 150 receives surveillance data, including image data from the imager 140 (702), and directs the surveillance data to be stored in the camera storage system 120 (704) on a continuous basis.

The backfill monitor 212 access information in the camera schedule 218 (706) and the transfer policy 208 (708), such as peak and off-peak transfer rate settings, priority and bandwidth settings for individual cameras, and scheduled transfer times for individual cameras. The backfill monitor 212 uses the information in the transfer policy 208 to determine, for example, which cameras 103 to request backfill surveillance data and/or the baseline transfer speed for each of the cameras 103. The backfill monitor 212 then requests the backfill surveillance data from the cameras (710).

In response to the request for the backfill surveillance data, the slave storage process 150 retrieves the backfill surveillance data from the camera storage system 120 (712) and sends it to the backfill monitor 212 (714), which directs the data to be stored in the VMS storage system 220 (716).

On a continuous basis, the backfill monitor 212 receives network usage information from the network usage process 216 (718). In response to receiving the network usage information, the backfill monitor 212 adjusts the transfer rate for the cameras 103, for example, by increasing or decreasing the baseline transfer rate specified in the transfer policy 208. The backfill monitor 212 then specifies the new data transfer rate to the slave storage process 150 (720), which continues to transfer the backfill surveillance data at the adjusted transfer rate (722) until the transfer is completed or until a new transfer rate is specified by the backfill monitor 212.

The backfill surveillance data is then stored in the VMS storage system 220 as before (724).

While this invention has been particularly shown and described with references to preferred embodiments thereof, it will be understood by those skilled in the art that various changes in form and details may be made therein without departing from the scope of the invention encompassed by the appended claims.

What is claimed is:

1. A video management system, comprising:
   a surveillance data store for storing surveillance data captured by one or more surveillance cameras; and
   a server system comprising:
      a memory; and
      at least one processor coupled with the memory and configured to:
         execute a storage process that requests surveillance data stored on the one or more surveillance cameras and stores the surveillance data stored on the one or more surveillance cameras to the surveillance data store in order to backfill surveillance data that is cached on the one or more surveillance cameras by requesting the surveillance data from individual surveillance cameras in a particular order based on a predefined user-specified transfer policy defined according to at least one of a camera attribute or a network attribute, wherein during normal operation, the one or more surveillance cameras send the surveillance data to be stored on the surveillance data store of the server system, wherein in response to attempting but failing to send the surveillance data to the server system, each surveillance camera affected by a network outage instead stores the surveillance data locally as backfill surveillance data and continues to attempt to transfer current surveillance data to the server system; and
         in response to successfully receiving current surveillance data from the surveillance cameras affected by the network outage, the storage process determines the particular order in which to request the backfill surveillance data from the surveillance cameras affected by the network outage based on the user-specified transfer policy and requests the backfill surveillance data in the particular order determined, wherein in response to requests for the backfill surveillance data, the surveillance cameras affected by the network outage send the backfill surveillance data to the storage process.

2. The video management system as claimed in claim 1, wherein the at least one processor coupled is further configured to execute a network usage process that monitors usage of a network connecting the one or more surveillance cameras to the server system.

3. The video management system as claimed in claim 2, wherein the network usage process reports a level of network usage to the storage process, and the storage process decreases or increases a rate at which the one or more surveillance cameras transfer the surveillance data to the storage process of the server system based on the level of network usage.

4. The video management system as claimed in claim 1, wherein the storage process accesses a camera priority policy dictating priority among the surveillance cameras, and wherein requesting the surveillance data from individual surveillance cameras in the particular order comprises requesting surveillance data stored on the surveillance cameras based on the priority policy.

5. The video management system as claimed in claim 1, wherein the storage process further accesses a transfer policy dictating network allowance information for the one or more surveillance cameras, the network allowance information for each surveillance camera specifying maximum data transfer rates for that surveillance camera, and wherein requesting the surveillance data from individual surveillance cameras in the particular order further comprises requesting the surveillance data stored on the one or more surveillance cameras based on the network allowance information.

6. The video management system as claimed in claim 1, wherein the storage process determines that backfill surveillance data has been cached on the one or more surveillance cameras due to a network outage and requests the backfill surveillance data that was cached on the one or more surveillance cameras during the network outage.

7. The video management system as claimed in claim 1, wherein the storage process requests backfill surveillance data that was cached on the surveillance cameras based on a camera transfer schedule.

8. The video management system as claimed in claim 1, wherein the surveillance data includes image data, audio data and/or meta-data.

9. The video management system of claim 1, wherein the user-specified transfer policy defines settings for determining the particular order in which the storage process requests the surveillance data from the individual surveillance cameras.

10. The video management system of claim 1, wherein the user-specified transfer policy defines for each surveillance camera settings for determining a baseline transfer speed with respect to a rate at which the surveillance camera transfers the surveillance data to the storage process.

11. The video management system of claim 10, wherein the storage process decreases for a duration of time the rate at which a particular surveillance camera transfers the surveillance data to the storage process from the baseline transfer speed defined for the particular surveillance camera in the user-specified transfer policy in response to determining that there is high network loss for the particular surveillance camera.

12. The video management system of claim 11, wherein the storage process restores the rate at which the particular surveillance camera transfers the surveillance data to the storage process to the baseline transfer speed defined for the particular surveillance camera in the user-specified transfer policy in response to determining that network load has returned to normal conditions.

13. The video management system of claim 1, wherein the storage process resolves contention among multiple cameras or groups of cameras with identical settings in the transfer policy based on types and/or capabilities of the individual surveillance cameras and/or network conditions recorded from past surveillance data transfers.

14. The video management system of claim 1, wherein the storage process receives network usage information from a network usage process on a continuous basis and, based on the network usage information, adjusts a rate at which each surveillance camera affected by the network outage transfers the backfill surveillance data to the storage process with respect to a baseline transfer speed defined for each surveillance camera in the user-specified transfer policy, and, in response to receiving the adjusted rate from the storage process, the surveillance cameras affected by the network outage continue to transfer the backfill surveillance data to the storage process at the adjusted transfer rate until the transfer is complete or until a new transfer rate is received from the storage process.

15. A surveillance data storage management method, comprising:
    requesting surveillance data that is cached on one or more surveillance cameras by requesting the surveillance data from individual surveillance cameras in a particular order based on a predefined user-specified transfer policy defined according to at least one of a camera attribute or a network attribute, wherein during normal operation, the one or more surveillance cameras send the surveillance data to be stored on a surveillance data store, wherein in response to attempting but failing to send the surveillance data, each surveillance camera affected by a network outage instead stores the surveillance data locally as backfill surveillance data and continues to attempt to transfer current surveillance data;
    in response to successfully receiving current surveillance data from the one or more surveillance cameras affected by the network outage, determining the particular order in which to request the backfill surveillance data from the surveillance cameras affected by the network outage based on the user-specified transfer policy and requesting the backfill surveillance data in the particular order determined, wherein in response to requests for the backfill surveillance data, the surveillance cameras affected by the network outage send the backfill surveillance data; and
    storing the surveillance data to surveillance data store in order to backfill the surveillance data.

16. The surveillance data storage management method as claimed in claim 15, further comprising monitoring usage of a network connecting the one or more surveillance cameras to the server system.

17. The surveillance data storage management method as claimed in claim 16, further comprising determining a level of network usage based on the monitored usage of the network and decreasing or increasing a rate at which the one or more surveillance cameras transfer the surveillance data based on the level of network usage.

18. The surveillance data storage management method as claimed in claim 15, further comprising accessing a camera priority policy dictating priority among the one or more surveillance cameras, and wherein requesting the surveillance data from individual surveillance cameras in the particular order comprises requesting the surveillance data stored on the one or more surveillance cameras based on the priority policy.

19. The surveillance data storage management method as claimed in claim 15, further comprising accessing a transfer policy dictating network allowance information for the one or more surveillance cameras, the network allowance information for each surveillance camera specifying maximum data transfer rates for that surveillance camera, and wherein requesting the surveillance data from individual surveillance cameras in the particular order comprises requesting surveillance data stored on the one or more surveillance cameras based on the network allowance information.

20. The surveillance data storage management method as claimed in claim 15, further comprising determining that backfill surveillance data has been cached on the one or more surveillance cameras due to the network outage and requesting the backfill surveillance data that was cached on the one or more surveillance cameras during the network outage.

21. The surveillance data storage management method as claimed in claim 15, further comprising requesting backfill surveillance data that was cached on the one or more surveillance cameras based on a camera transfer schedule.

22. The surveillance data storage management method as claimed in claim 15, wherein the surveillance data includes image data, audio data and/or meta-data.

23. A surveillance data storage management method, comprising:
   requesting surveillance data that is cached on one or more surveillance cameras by requesting the surveillance data from individual surveillance cameras in a particular order based on a predefined user-specified transfer policy defined according to at least one of a camera attribute or a network attribute, wherein during normal operation, the one or more surveillance cameras send the surveillance data to be stored on a surveillance data store, wherein in response to attempting but failing to send the surveillance data, each surveillance camera affected by a network outage instead stores the surveillance data locally as backfill surveillance data and continues to attempt to transfer current surveillance data;
   receiving, from the one or more surveillance cameras, a request for transfer tickets;
   in response to successfully receiving current surveillance data from the one or more surveillance cameras affected by the network outage, determining transfer rates for the transfer tickets based on a predefined user-specified transfer policy defined according to at least one of a camera attribute or a network attribute and sending the transfer tickets to the one or more surveillance cameras;
   receiving, from the one or more surveillance cameras affected by the network outage, cached surveillance data to ata video management system according to the transfer tickets; and
   storing the surveillance data to a surveillance data store in order to backfill the surveillance data.

24. The surveillance data storage management method as claimed in claim 23, further comprising the video management system determining a level of network usage and decreasing or increasing the transfer rates based on the level of network usage.

25. The surveillance data storage management method as claimed in claim 23, further comprising accessing a camera priority policy dictating priority among the surveillance cameras and/or network allowance specifying maximum data transfer rates, and wherein determining the transfer rates for the transfer tickets comprises determining the transfer rates for the transfer tickets based on the priority policy and/or network allowance.

26. The surveillance data storage management method as claimed in claim 23, wherein the transfer tickets are first transfer tickets, and further comprising sending second transfer tickets to the surveillance cameras specifying updated transfer rates in response to receiving new requests for transfer tickets.

* * * * *